United States Patent [19]
Nebelung et al.

[11] 3,775,083
[45] Nov. 27, 1973

[54] PNEUMATIC SELECTIVE GLASS GOB DISTRIBUTION SYSTEM

[75] Inventors: Hermann H. Nebelung, Binz-Maur, Switzerland; Thomas V. Foster, Cantley Manor, England

[73] Assignee: Emhart Corporation, Bloomfield, Conn.

[22] Filed: July 2, 1971

[21] Appl. No.: 159,262

[52] U.S. Cl. .................. 65/225, 65/207, 65/304
[51] Int. Cl. .............................................. C03b 5/30
[58] Field of Search ............... 65/225, 222, 303, 65/304, 207

[56] References Cited
UNITED STATES PATENTS

| | | | |
|---|---|---|---|
| 3,585,017 | 6/1971 | Trudeau | 65/225 X;225 |
| 3,333,938 | 8/1967 | Zappia | 65/225 |
| 3,147,102 | 9/1964 | Trudeau | 65/304 X |
| 1,637,452 | 8/1927 | Nelson | 65/207 |
| 2,637,429 | 5/1953 | Pond | 65/304 X |
| 1,399,176 | 12/1921 | Whittemore | 65/207 |
| 1,911,119 | 5/1933 | Ingle | 65/225 X |
| 2,598,955 | 6/1952 | Winder | 65/304 X |
| 2,958,159 | 11/1960 | Denman | 65/304 X |
| 3,552,942 | 1/1971 | Trudeau | 65/304 |
| 3,592,624 | 7/1971 | Dahms | 65/225 X |
| 1,816,309 | 7/1931 | Barker | 65/222 |
| 2,836,934 | 6/1958 | McLaughlin et al. | 65/225 |
| 3,634,660 | 1/1972 | Moran et al. | 65/158 |

*Primary Examiner*—S. Leon Bashore
*Assistant Examiner*—Kenneth M. Schor
*Attorney*—Roger B. McCormick et al.

[57] ABSTRACT

A system for distributing successively formed groups of glass gobs from a feeder bowl to the several individual sections of a Hartford I. S. Glassware Forming Machine includes a single scoop for each gob in the group, and mechanism for rotating the scoops between successive positions wherein each is aligned with a chute associated with a particular mold cavity in each machine section. A "double-gob" installation is described and the two scoops have associated annular spur gears which are driven in unison by a pair of reciprocable rack gears through a predetermined schedule of angular displacements to successively align the two scoops with several sets of paired chutes according to a particular "firing" order. A pair of air-driven actuators are stopped by any one or more of a plurality of individual pistons, each of which pistons are individually movable through a predetermined linear displacement and stopped by other pistons in turn. The programmed movement of the rack gears is provided in response to compressed air provided at predetermined ports in the actuators to produce the predetermined schedule of angular displacements of the scoops.

6 Claims, 15 Drawing Figures

$S_2$ POSITION $S_1$ POSITION

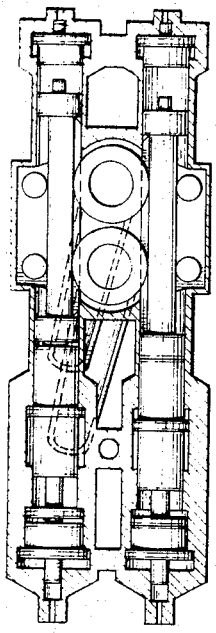
FIG. 8 S₄ POSITION
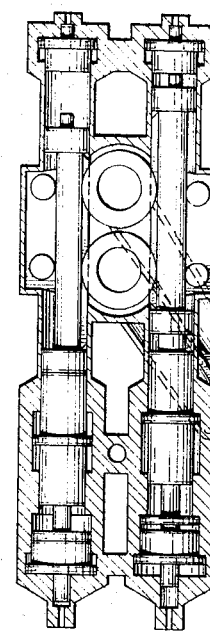
FIG. 10 S₆ POSITION
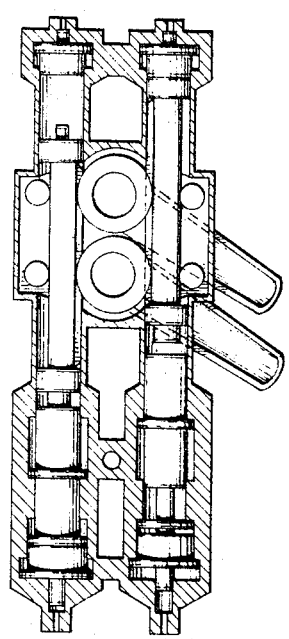
FIG. 12 S₈ POSITION
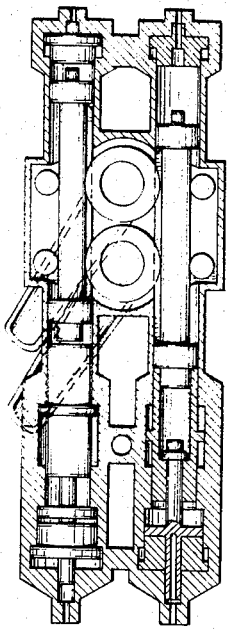
FIG. 7 S₃ POSITION
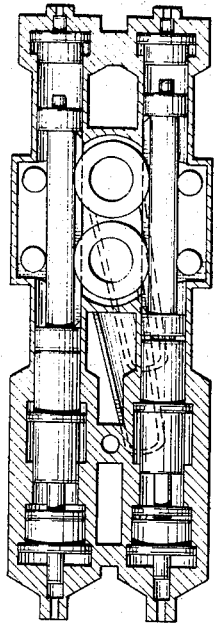
FIG. 9 S₅ POSITION
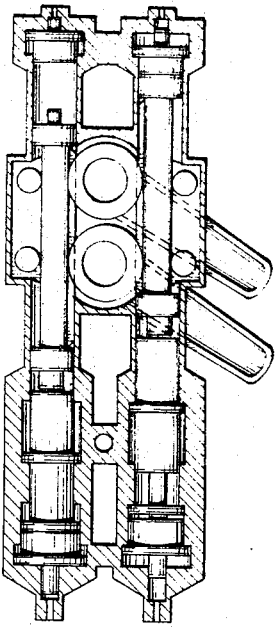
FIG. 11 S₇ POSITION

FIG. 14

| GLASSWARE MACHINE INDIVIDUAL SECTION PULSE | | | | | | | | | SPOOL VALVE CONDITION | | | | | | | | | | | PISTON CONDITION | | | | | | | | | | | SCOOP POSITION |
|---|---|---|---|---|---|---|---|---|---|---|---|---|---|---|---|---|---|---|---|---|---|---|---|---|---|---|---|---|---|---|
| 1 | 2 | 3 | 4 | 5 | 6 | 7 | 8 | | A | B | C | D | E | F | G | H | I | J | | 1 | 5 | 2 | 6 | 3 | 7 | 4 | 8 | 9 | 10 | |
| X | | | | | | | | | X | X | X | X | | | | | | | | R | L | R | L | R | L | R | R | $L_1$ | $R_1$ | $S_1$ |
| | X | | | | | | | | X | X | X | X | X | | | | | | | R | L | R | L | R | L | L | R | $L_2$ | $R_2$ | $S_2$ |
| | | X | | | | | | | | X | X | X | | | | | | | | R | L | R | L | R | $C_L$ | R | R | $L_3$ | $R_3$ | $S_3$ |
| | | | X | | | | | | | | X | X | | | | | | | | R | R | R | C | $C_R$ | R | R | R | $L_4$ | $R_4$ | $S_4$ |
| | | | | X | | | | | | | | | | | | | | | | R | R | R | C | $C_R$ | R | R | R | $L_5$ | $R_5$ | $S_5$ |
| | | | | | X | | | | | | | | | | X | X | X | X | | L | R | L | R | $C_L$ | R | R | R | $L_6$ | $R_6$ | $S_6$ |
| | | | | | | X | | | | | | | | | | X | X | X | | L | R | L | R | L | $C_L$ | R | R | $L_7$ | $R_7$ | $S_7$ |
| | | | | | | | X | | | | | | | | | X | X | X | X | L | R | L | R | L | R | R | R | $L_8$ | $R_8$ | $S_8$ |
| | | | | | | | | | | | | | | | | | | | | R | R | R | R | R | R | R | R | $L_0$ | $R_0$ | $S_0$ |

X INDICATES PULSE FROM INDIVIDUAL MACHINE SECTION

X INDICATES VALVES WHICH ARE AIR BIASED TO THE LEFT IN FIG. 4

PNEUMATIC SELECTIVE GLASS GOB DISTRIBUTION SYSTEM

BACKGROUND OF THE INVENTION

The present invention, in principle, performs much the same purpose as a copending application to the same assignee entitled "Molten Glass Gob Distribution System," filed Jan. 7, 1970, under Ser. No. 1,096 now issued by mesne continuations under U.S. Pat. No. 3,721,544 on Mar. 20, 1973. The invention disclosed in the prior application, as in the present application, is intended for use in glassware production machines of the pneumatically controlled type. Several individually controllable sections are provided in such a machine, each capable of molding the glassware articles. Each section includes a mold assembly of single, double or triple cavity design, and all of these various machine sections in a single machine are to be sequentially supplied with molten glass gobs or charges from a single feeder bowl and forehearth installation. The feeder bowl has an outlet wherein groups of glass gobs are successively formed to fill the single, double or triple gob mold cavity design of the sections.

Chutes are generally provided to direct the successively formed groups of glass gobs to the individual machine sections, and each group of such chutes has an upper end which is located in a semi-circular pattern around the outlet of the feeder bowl. Heretofore arcuate scoops associated with these chutes have usually been reciprocated from and to active positions beneath the feeder bowl to direct the newly formed gobs to the appropriate chutes. Several groups of scoops must be moved in proper sequence to direct the gobs of molten glass into the molds of the appropriate machine sections. For example, in a typical eight section machine, equipped with double gob mold assemblies, some sixteen scoops must be actuated by eight separate fluid motors.

A principal object of the present invention is to provide a single mechanism for accomplishing this glass gob distribution function wherein successively formed groups of glass gobs are sequentially fed into chutes associated with the multicavity molds of a multiple section glassware forming machine.

A more specific object of the present invention is to provide a compact mechanism of the foregoing character wherein air-driven means is provided for moving the arcuate scoops on vertical axes to align the lower end of said scoops with the various chutes associated with the various individual sections of a glassware forming machine having several pneumatically controlled individual sections.

SUMMARY OF THE INVENTION

In its presently preferred form, the present invention contemplates a plurality of fixed chutes arranged in groups in a circular fashion adjacent the outlet spout of a feeder bowl. These chutes have their respective upper end arranged in a circular pattern immediately below the outlet spout of the feeder bowl, and each chute has its lower end associated with a mold opening in a particular section of the Hartford I. S. glassware forming machine. One arcuate scoop is provided for each gob in the group being formed at the outlet spout of the feeder bowl, and in the double gob installation to be described, two such scoops are utilized and are rotated in unison through predetermined angular displacements so as to be successively aligned with the upper ends of the various chutes in accordance with a predetermined schedule. Control means for varying these angular displacements of the scoops is provided through pneumatic actuators in cooperation with a plurality of pistons, each of which pistons has an associated inlet and outlet port for selectively stopping one of the two actuators. Each actuator defines a rack gear segment for rotating spur gears associated with each of the scoops themselves.

BRIEF DESCRIPTION OF THE DRAWINGS

FIGS. 5 through 12, inclusively, show the mechanism of FIG. 4 with the pair of scoops being shown in each of their various positions.

FIG. 14 is a tabulation of the various conditions for the pistons of FIG. 13 illustrating the correlation between these piston positions and the scoop positions as well as the correlation between these piston positions and the control valves.

DETAILED DESCRIPTION

Figure 1:
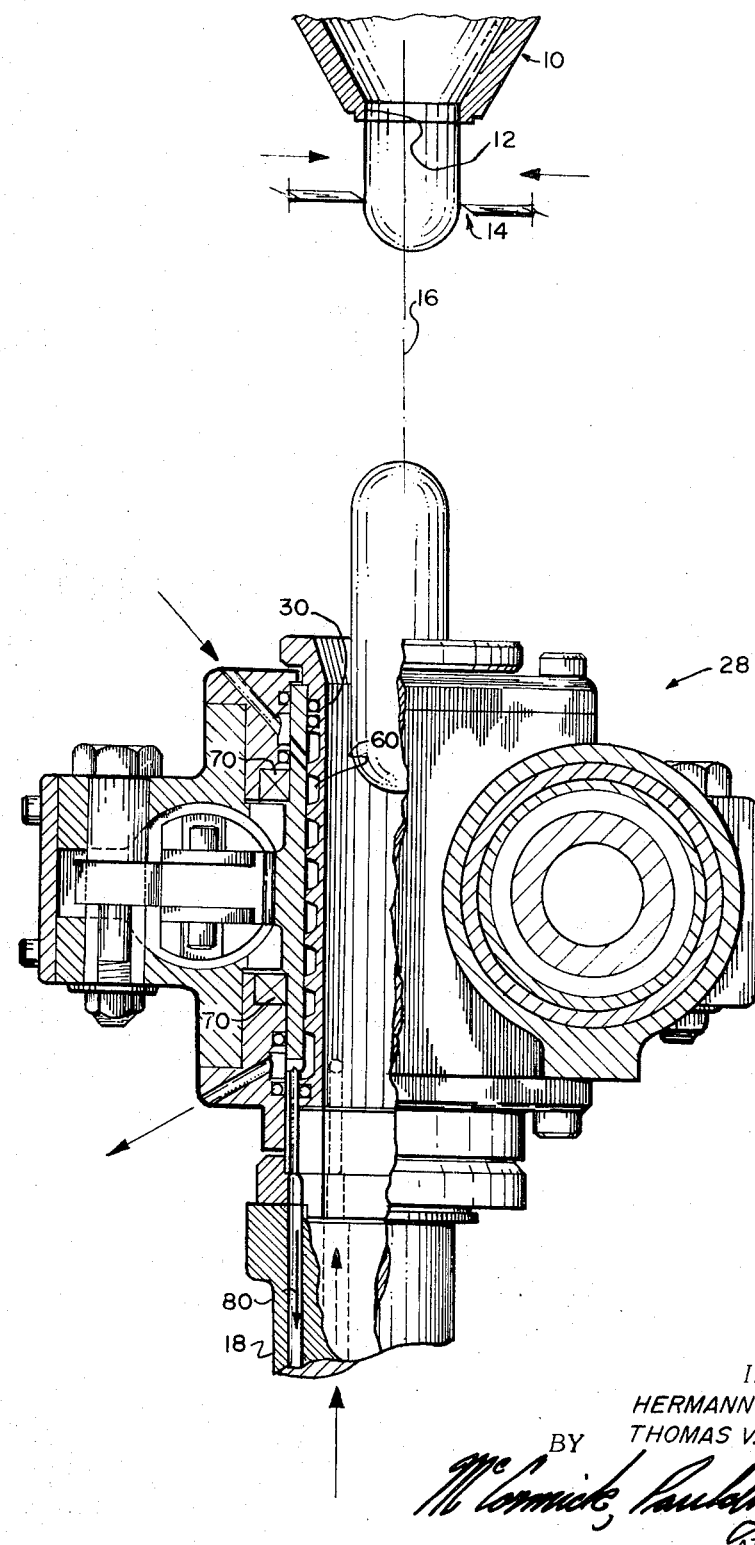
FIG. 1 is an elevational view partly in vertical section showing the mechanism of the present invention and its relationship to the outlet spout of a feeder bowl and the associated shear blades commonly provided immediately below the feeder bowl outlet spout.

Turning now to the drawings in greater detail, FIG. 1 shows in schematic fashion the outlet spout of a typical feeder bowl 10. A gob forming mechanism (not shown) of conventional configuration is provided in the feeder bowl to form gobs of molten glass in a well-known manner for use in the individual sections of a typical glassware forming machine. The feeder bowl outlet spout is more particularly defined by a double gob orifice plate 12, only one of the openings of which are shown in FIG. 1. A conventional glass gob shear mechanism, indicated schematically at 14, is provided below the feeder bowl 10 to sever the glass gob charges emanating from the orifice 12 in a well-known manner. The glass gobs will fall downwardly, along the line 16, through a funnel portion of the mechanism to be described and thence downwardly through an arcuate scoop 18 into one of several chutes, shown to best advantage in FIG. 15, for delivery to the appropriate cavities in the appropriate sections of the glassware forming machine.

Figure 3:
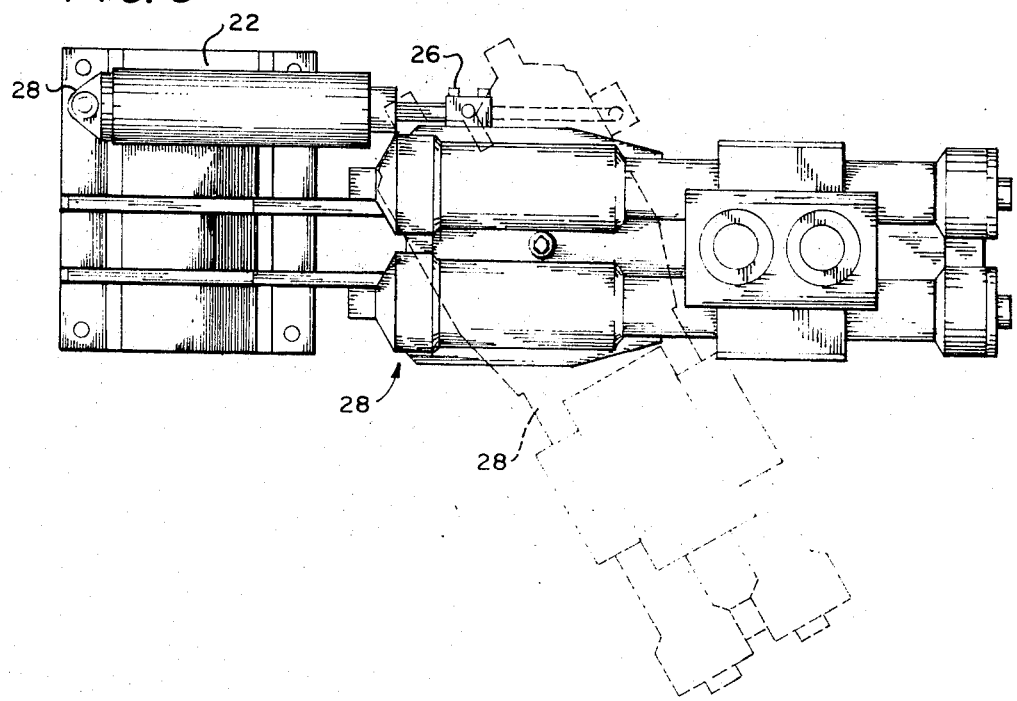
FIG. 3 is a plan view of the mechanism shown in FIGS. 1 and 2 with the housing being shown in broken lines in an inactive position so oriented that the scoops are swung clear of the feeder bowl outlet.
Figure 13:
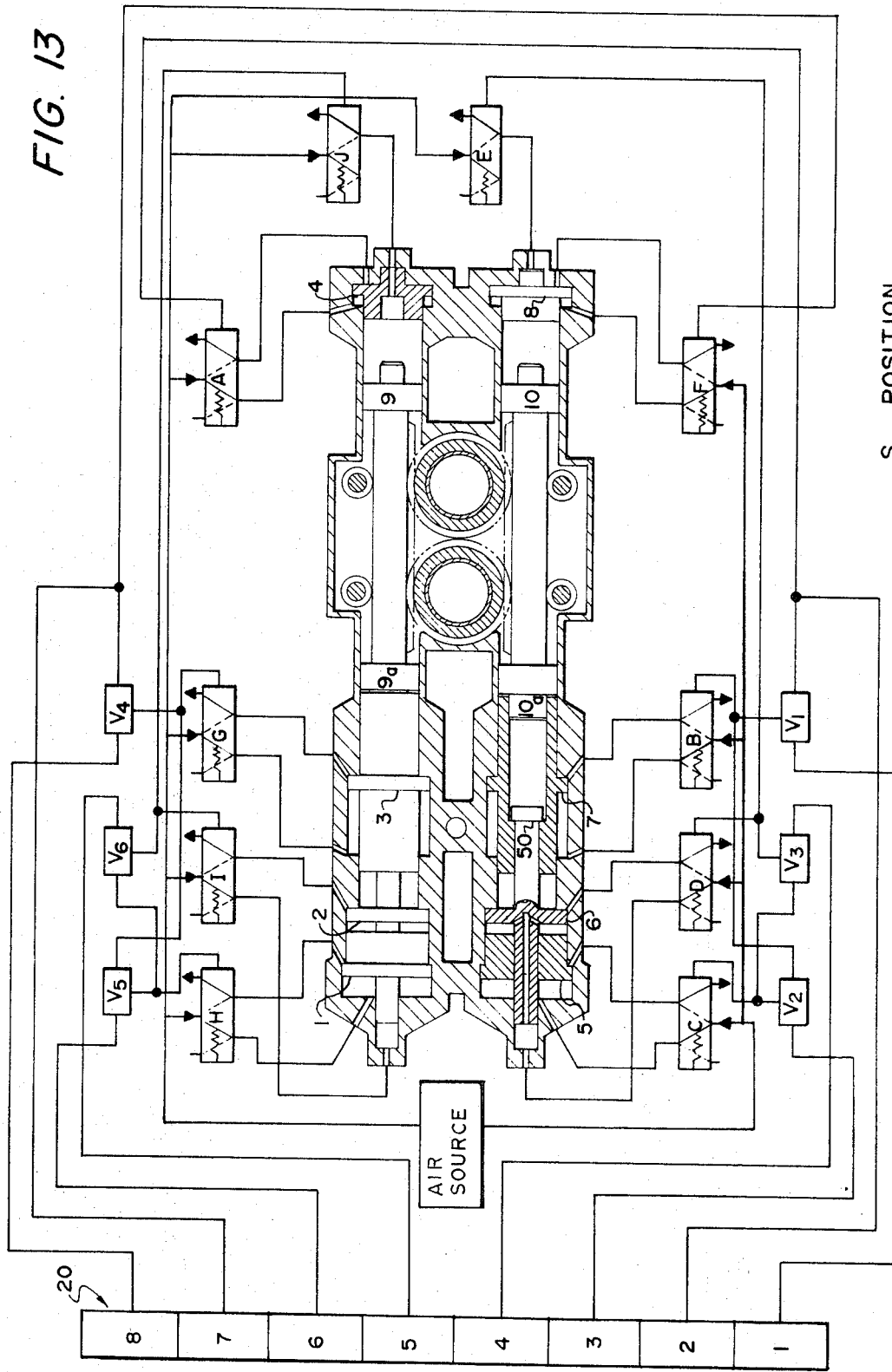
FIG. 13 is a schematic view of the mechanism shown in FIGS. 1–12 with the components of the pneumatic system utilized in achieving the predetermined linear displacements of the actuators.

The glassware forming machine shown comprises eight individual sections, as indicated schematically at 20 in FIG. 13. Each of these machine sections is itself air operated, according to conventional practice, and a pneumatic pulse is provided from each machine section to sequentially operate the mechanism to be described. In the event that the machine is to be shut down for any reason and hence cannot accept these gobs of molten glass, means is provided for disposing of the glass gobs by providing an alternate position for the pair of scoops to be described and carrying the gobs away in a cullet chute (not shown). FIG. 3 shows such an alternate position for these scoops.

Figure 2:
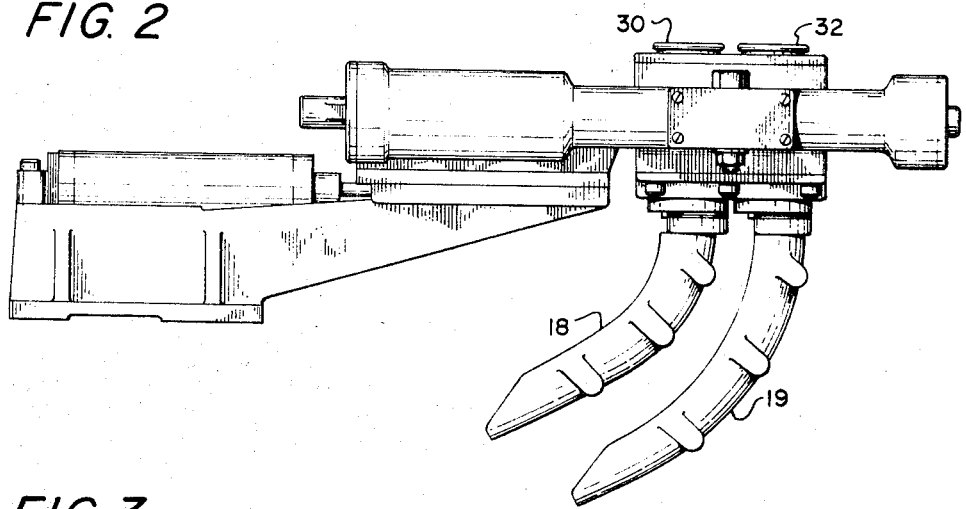
FIG. 2 is a vertical elevational view of the mechanism shown in FIG. 1.
Figure 15:
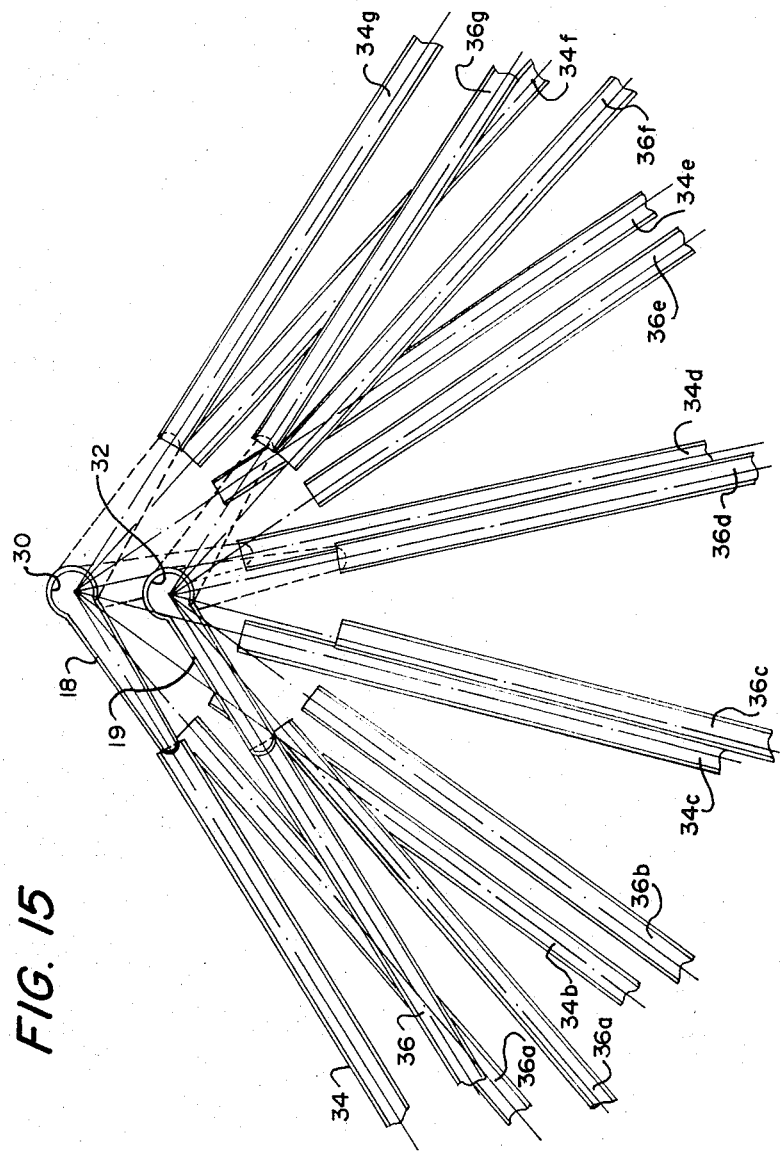
FIG. 15 is a plan view of the chute pattern to be supplied with molten glass gobs from the two scoops.

Referring now to FIG. 2, the mechanism to be described is adapted for use in a double-gob type glassware forming machine, two glass gobs being capable of passing through upper funnel portions 30 and 32 of the scoops 18 and 19 respectively. In the positions shown for the scoops 18 and 19, these glass gob charges would be directed laterally to the left and into fixed chutes (not shown). Several groups of such chutes are provided as shown in FIG. 15, and each group is associated with one of the individual machine sections. The prior copending application referred to above gives a more complete description of the fixed chutes 34a–34g and 36a–36g shown in FIG. 15, and it is sufficient for present purposes to note that these chutes are arranged in pairs, and in a semi-circular pattern. The mechanism of the present invention is adapted to rotate the scoops 18 and 19 through the successive positions, shown in FIGS. 5 through 12, so as to align these scoops successively with the fixed chutes 34a–34g and 36a–36g associated with the eight-section machine. Still with reference to FIG. 3, an air motor, or cylinder 22, can be seen to be connected between fixed structure 24 of the glassware machine frame, and to a lug 26 provided for this purpose on one side of a housing 28 of the mechanism for operating the scoops. Extension of this air cylinder 22 moves the scoops 18 and 19, and more particularly tht entire housing 28 from the solid line position shown to the broken line position to permit the glassware machine to be shut down for any purpose. The feeder bowl mechanism may be shut down as well or the gobs collectively disposed of by suitable means (not shown). Still another purpose for this alternate position for the housing 28 is to provide a convenient means for shifting the scoop mechanism to one side when it must be given periodic maintenance, or when work must be done upon the feeder bowl or on the associated shear mechanism.

Figure 4:
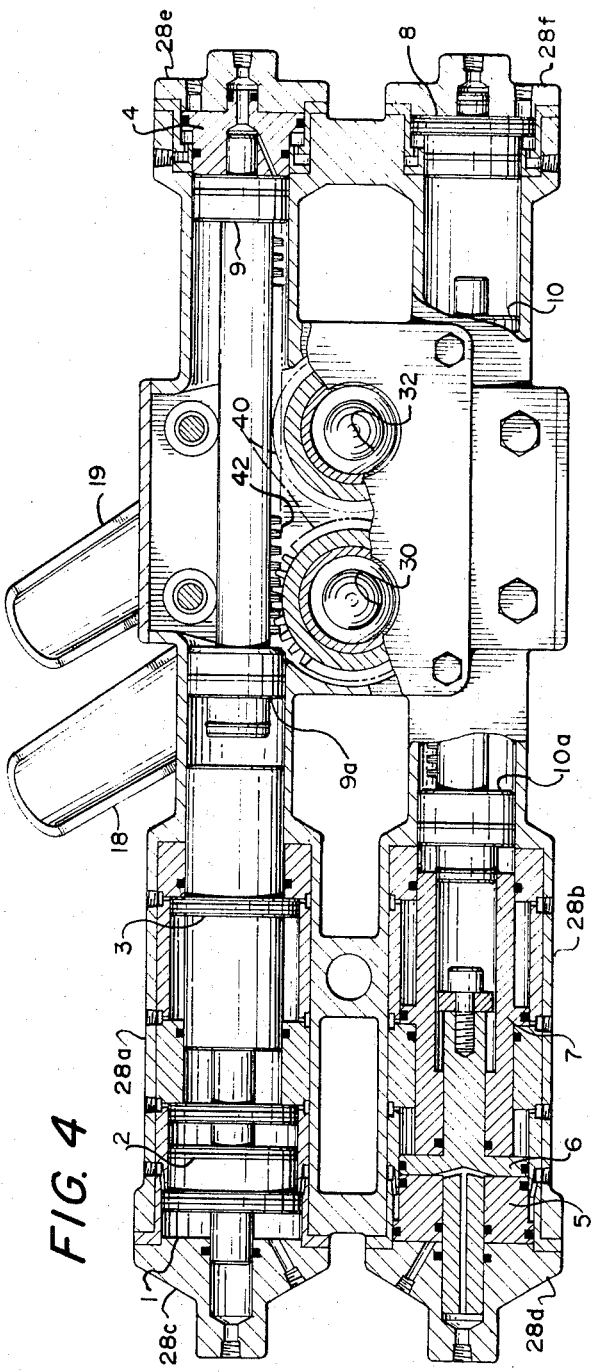
FIG. 4 is a horizontal view partly in section showing the various pistons and associated actuators provided in a mechanism of the type shown in FIGS. 1–3.

Turning now to a more complete description of the housing and the mechanism contained therein for supporting and for moving the depending scoops 18 and 19, FIG. 1 shows the scoop 18 as having an upper funnel portion 30 which is of tubular shape, and which communicates at its lower end with the upper end of the arcuate portion of the scoop 18. The other scoop 19 is similarly supported from its associated tubular funnel portion 32. Each of the tubular portions 30 and 32 carry an annular spur gear 40 best shown in FIG. 4, and preferably this gear is located midway between the upper and lower ends of the funnel portion 30. These spur gears 40, 40 mesh with a pair of rack gears 42, 42 located one on either side of the spur gears and arranged to move in opposite directions in synchronism with one another. These rack gears are defined on portions of a pair of elongated air actuator members, each of which members carry pistons at their opposite ends as indicated generally at 9 and 10 in FIG. 4. As so constructed and arranged, linear movement of one of the other of these actuator members, in response to movement of one of the other of the pistons 9 or 10 is effective to rotate the scoops 18 and 19 through equal angular displacements. For example, movement of the rack gear by means of movement of the piston 10 toward the left in FIG. 4 is effective to rotate the scoops 18 and 19 in a clockwise manner. Conversely left-hand movement of the piston 9 causes counterclockwise movement of these scoops.

Turning now to a more detailed description of the housing 28 which contains the mechanism for rotating the scoops 18 and 19 through their predetermined angular displacements, FIG. 4 shows in horizontal section internal parts of the two tandem cylinders 28a and 28b. These cylinders are arranged parallel to one another on opposite sides of the spur gears 40 and 40 associated with the rotary scoops, 18 and 19 respectively. Each of these cylinders carries a plurality of pistons, each of which pistons is movable between at least two positions, referred to herein as left and right positions, L and R respectively, so as to be effective to stop one or the other of the rack gear members 42, 42 in its longitudinal travel within its associated housing. More particularly, by introducing compressed air into specific inlets associated with each of these pistons, one of the rack gear defining members 42 can be actuated so as to directly abut one or indirectly to abut another one to achieve the variety of linear positions required to define a desired schedule of scoop positions to direct gobs of molten glass into the various chutes indicated in FIG. 15. A signal from the individual glassware forming machine section, boxes 1–8 in FIG. 13, positions the proper valves A–J, and moves the appropriate pistons, 1–8, through a pneumatic control system to be described. FIG. 14 shows in tabular fashion the variety of conditions necessary to achieve a particular scoop position. Pistons 9 and 10 are directly connected to the two actuators 42, 42 which define the rack gear segments meshing with the spur gears 40, 40. The two cylinder housings 28a and 28b are generally similar to one another structurally, and pistons 1, 2, 3, 4 and 9 are slidably mounted in the housing 28a. Pistons 5, 6, 7, 8 and 10 are provided in cylinder housing 28b. Both housings and associated pistons function in substantially the same manner. More particularly, pistons 1 and 5 can be seen from FIG. 4 to be stopped in their left-hand motion by the cylinder heads 28c and 28b respectively. These pistons 1 and 5 are stopped in their motion toward the right by buffer flanges defined on the inner wall of a liner provided in the cylinder housing 28a and 28b respectively. Pistons 2 and 6 are stopped in their motion to the left by pistons 1 and 5 and in their motion to the right by buffer flanges defined on a somewhat smaller size buffer liner associated with each of the cylinder housings 28a and 28b respectively. Pistons 3 and 7 are similarly stopped by flanges on the opposite end of this buffer liner, at least as to the left-hand motion, and by flanges defined on still another liner associated with motion in the right-hand direction. Pistons 4 and 8 are stopped in their motion to the right by cylinder heads 28b and 28f and are stopped in their motion to the left by buffer flanges defined on still another liner associated with the right-hand ends of the cylinder housings 28a and 28b. Finally, pistons 9 and 10 are stopped in a variety positions dictated by the particular arrangement of the pistons associated with their respective cylinder housing. More particularly, piston No. 9 is carried at the right-hand end of one of the actuators, or rack gear defining member 42 and a follower piston 9a is provided on the same rack gear defining member so as to provide, at the opposite end of this member, a surface for abutting the adjacent pistons 3 and 7 as best shown in FIG. 4. As so constructed and arranged, these actuators 42, 42 can be stopped in their respective motions at four different positions, referred to in FIG. 14 as R, L, CR and CL. Air inlet and exhaust ports are provided in the side walls of the cylinders 28a and 28b for providing compressed air to the desired side of the associated piston or pistons to provide a stop surface for one or the other of the two ends of both rack gear defining members 42, 42, and the various motions possible with the arrangement described above will now be discussed in detail.

As shown to best advantage in FIG. 13, the eight-section glassware forming machine 20 provides successive control signals from each of its individual sections to the pneumatic actuator mechanism of the present invention through shuttle valves, V1–V6 inclusively, to actuate certain of the spool valves A–J inclusively. The spool valves are of conventional construction, and each of them has two positions whereby to direct air under pressure to one of the other of its two output ports, and to allow exhaust air to be vented through the one of two exhaust ports. The spool is spring loaded to the right in each of the valves shown in FIG. 13, and capable of being air biased to the left in response to a control signal from the appropriate machine section. In its right-hand position (no control signal) each spool valve directs air under pressure to the left-hand side of certain of the pistons, and in its left-hand position (control signal from individual section as indicated by X in FIG. 14) each spool valve directs air under pressure to the right-hand side of certain of these pistons. The individual positions of these spool valves and pistons will now be discussed in detail.

Figure 5:
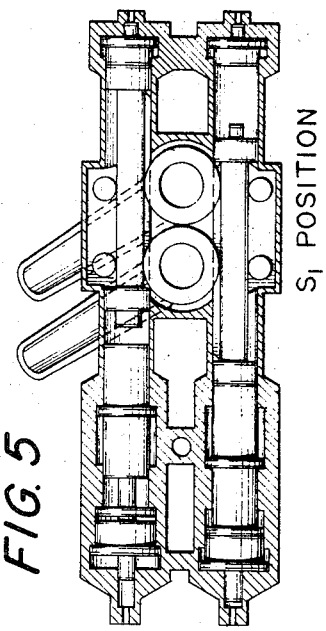

FIG. 5 shows the positioning of the pistons when certain of the spool valves are actuated to shift the scoops and convey gobs of molten glass to the first machine section. The signal, or impulse from machine section 1 actuates the spool valves B and C, through shuttle valve V1. Shuttle valves V2 and V3 are also opened to actuate spool valves D and E respectively. Thus, air is provided under pressure through the spool valves B and C to pistons 5 and 7, and through spool valves D and E, to pistons 8 and 6. Pistons 5, 6 and 7 are placed under air pressure so as to be displaced toward the left against their associated stops. Piston 10 is driven under air pressure toward the left also, transmitting its rectilinear movement to the pair of spur gears 40, 40 associated with the scoops 18 and 19, until piston No. 9 strikes piston No. 4 which is in the right-hand or starting position as shown in FIG. 5. Thus, scoop position S1, depicted in FIG. 5, is determined by piston 4. The remaining spool valves H, I, G, A, J and F receive no impulse and pistons 1, 2, 3, 4 and 8 remain in their right-hand or start-up positions.

Figure 6:
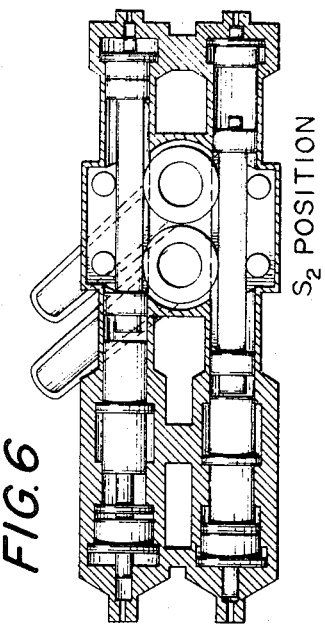

FIG. 6 shows the position of the pistons when the scoops move to position S2. A control signal is provided from machine section 2, and valves A, B, C, D and E are air operated toward the left to move piston 4 toward the left in addition to the piston movement, referred to in the preceding paragraph. Piston 9 also moves incrementally and the scoops are brought into position S2 through the spur gears 40, 40. Piston 4 is of slightly larger diameter than piston 10 to overcome the latter's effect on the incremental movement of piston 4.

FIG. 7 shows the positioning of the pistons when the scoops have moved to position S3. The glassware forming machine again provides an impulse or control signal through its valve block and as shown in FIG. 13, only spool valves C, D and E are actuated via the shuttle valves V2 and V3. Pistons 5 and 6 are placed under air pressure from the right and displaced towards the left L, L in FIG. 14 against their associated stops, and piston 6 holds piston 7 in position CL by means of the collar, or nut 50, provided for this purpose on piston 6. Piston 10, under air pressure from the right through valve E is displaced towards the left up to the point where it strikes piston 7 which is in position CL. Thus, scoop position S3 is determined through pistons 10 and 7.

FIG. 8 shows the various positions of the pistons when the scoops have moved to position S4. The impulse or control signal is again derived through the valve block in section 4 and spool valves D and E are actuated through shuttle valve V3. Since spool valve C received no implulse, piston 5 is placed under air pressure from the left and displaced toward the right into a stop position R. Spool valve D places piston 6 under air pressure from the right, and piston 6 is displaced toward the left against piston 5 to a mid-position C. Piston 7 is placed under air pressure from the left since spool valve B has no impulse, and piston 7 is displaced toward the right until it is held by the end collar 50 of piston 6 in position CR. Piston 10, since it is under air pressure from the right through spool valve E moves to the left until its left-head 10a abuts piston 7. Thus, scoop position S4 is determined by pistons 5, 6 and 7.

FIG. 9 shows the positioning of the various pistons when the scoops move to position S5, that is, for servicing machine section 5 with molten glass gobs. The machine section provides a control signal, or impulse, to spool valves I and J through shuttle valve V6. Since spool valve H received no impulse, piston 1 is placed under air pressure from the left and hence displaced toward the right to its active position. Spool valve I places piston 2 under air pressure from the right displacing piston 2 toward the left against piston 1. Piston 3 is moved to the right, through spool valve G which has no impulse, until it is held against end collar 50 of piston 2 as indicated at CR in FIG. 14. Piston 9, under air pressure from the right through spool valve J, reaches its active position against piston 3. Thus, position S5 is determined by pistons 1, 2 and 3.

FIG. 10 shows the positions of the various pistons when the scoops are in position to service machine section 6. The section provides an impulse, through its valve block, to spool valves H and I as well as spool valve J through shuttle valves V5 and V6. Pistons 1 and 2 are placed under air pressure from the right and displaced toward the left against their associated stops. End collar 50 on piston 2 holds piston 3 in position CR in FIG. 14. Piston 9, under air pressure from the right through spool valve J is displaced toward the left up to the point where it strikes piston 3 which is in position CR. Thus, scoop position S6 is determined by pistons 9 and 3.

FIG. 11 shows the positioning of the pistons when the scoops move to service machine section 7. The impulse is provided through the valve block of section 7 to spool valves G, H and I, as well as spool valve J, through shuttle valves V4, V5 and V6. Pistons 1, 2 and 3 are placed under air pressure from the right and displaced toward the left against their associated stops. Piston 9 is placed under air pressure from the right through spool valve J. Piston 8 is placed under air pressure from the right through spool valve F, and at the same time piston 8 is displaced toward the left incrementally to engage piston 10. Thus, piston 9 brings the scoops into position S7 through the spur gears 40, 40 which engage the rack gear elements described above.

FIG. 12 shows the positioning of the various pistons when the scoops move into position for servicing machine section 8. The section impulse or control input signal is provided through the valve block associated with section 8 to spool valves G, H, I and J which spool valves are collectively energized through shuttle valves V4, V5, V6. Pistons 1, 2 and 3 are placed under air pressure from the right and displaced toward the left against their associated stops. Piston 9, under air pressure from the right transmits its movement, via the pair of spur gears 40, 40, until piston 10 strikes piston 8. Thus, scoop position S8 is determined by piston 8.

FIG. 13 shows the positioning of the pistons when the scoops are moved to a stop position indicated by S0 in FIG. 13 as to conduct the group of glass gobs somewhere other than the glassware machine. That is, the scoops 18 and 19 are arranged in a mid position between positions S4 and S5 depicted in FIGS. 8 and 9 respectively. More particularly, if no machine section impulse is conducted to any of the spool valves, A through J inclusively, the various pistons, 1 through 8, are placed under air pressure from the left and displaced toward the right up to their firing positions shown in FIG. 13. Pistons 9 and 10 receive no air, that is, spool valves E and J are switched to pressure release. Pistons 3 and 7 bring pistons 9 and 10, and thus the scoops through the pair of spur gears 40, 40, into the mid position described above.

FIG. 14 shows in tabular form the input conditions and various spool valve conditions, and the various piston positions or conditions, necessary to achieve a particular scoop position. The machine section pulse is either present (X) or not present, and the spool valve condition is either air actuated (X) or not. The piston condition nomenclature is used above but will be further clarified. Pistons 1 through 8 inclusively have at least two positions, either left L or right R. Pistons 3 and 7 have left, right and intermediate positions which require comment. Piston 3 not only has the left L and right R positions, but also has two center positions referred to as CR and CL in the table of FIG. 14. Similarly, piston 7 has two center positions similarly annotated in tabular form in FIG. 14. Pistons 9 and 10, since they comprise the rack gear elements themselves, have the eight positions associated with the eight machine sections, and in addition have the zero positions associated with the FIG. 13 condition described above. The scoop positions associated with the various pistons and valve conditions is described as S1 through S8 inclusively and this nomenclature corresponds to FIGS. 5 through 13 inclusively.

Before leaving the description of the cylinder housings 28a and 28b, it should be pointed out that considerable heat is given off by the glass gobs being distributed by the apparatus described hereinabove. Particularly so, since only two scoops are utilized to provide glass gobs to the eight sections of one double gob glassware forming machine. Each of these sections could be of the double or triple gob variety resulting in some twenty-four (24) gobs of glass being provided per cycle of the forming machine itself. In order to conduct away the radiation heat given off to the adjacent structure by the glass gobs falling, at intervals, through the funnels 30 and 32, the walls of the funnels have spirally arranged cooling passageways, as indicated generally at 60 in FIG. 1 through which cooling water is run. This cooling fluid also serves to protect the bearings indicated generally at 70 for the gear sleeve. The cooling water is conducted in from outside and then run via the upper portion of the groove through the spirally shaped channels 60 and thence through internal cooling passages of the scoops themselves as indicated generally at 80.

We claim:

1. In a molten glass gob distribution system for use with a glassware forming machine which includes a plurality of chutes associated with the various sections of such a machine, the upper ends of which chutes are arranged in a circular pattern extending at least part way around the outlet spout of a molten glass feeder mechanism of the type which is adapted to successively form glass gobs for delivery to said machine sections, the improvement comprising an arcuate scoop associated with each gob in a group, housing means for supporting said scoops in depending relationship for rotational movement about individual vertical scoop axes, an annular spur gear associated with each scoop, pneumatic actuator means for rotating said scoops through predetermined angular displacements to align them with predetermined chutes in said chute pattern, said actuator means including a plurality of individual pistons each of which is individually movable through a predetermined linear displacement, said actuator means including at least one rack gear defining member which meshes with said spur gears to cause rotational movement of said scoops in response to linear movement of said actuator means, pneumatic control means for biasing each of said individual pistons in one or an opposite direction in accordance with a predetermined schedule, at least one piston which is stopped by another piston to provide a left and a right position for said one piston and also to provide an intermediate position therefor, and an air spring piston at one end so as to be movable against one of the said pistons in an associated piston set to be stopped at a predetermined position, and a source of air under pressure for moving said actuator means in said housing in one of said directions to abut one or more of said pistons and to be stopped thereby at predetermined positions.

2. The system according to claim 1 wherein said actuator means comprises tandem linearly reciprocable members arranged on either side of said scoops and movable in directions opposite one another in said housing to rotate said scoops, said plurality of pistons being arranged in two sets located in line with said tandem reciprocable members respectively.

3. The system according to claim 2 wherein said housing means slidably receives said linearly reciprocable means on either side of said spur gears, and said housing means also slidably receiving said piston sets in axial alignment with their associated actuator means, some of said pistons in each set being of different diameters from one another.

4. The system according to claim 3 wherein at least one piston in each piston set is located adjacent one of said air spring pistons and is of slightly larger diameter than said air spring piston whereby to stop one of said linearly reciprocable members when the other member is moved by its associated air spring piston.

5. The system according to claim 4 wherein both piston sets are symmetrically arranged in their neutral positions in said housing means with respect to a horizontal line drawn through both scoop axes of rotation.

6. The system according to claim 5 wherein said pneumatic control means includes a series of control signals derived from the individual machine sections, and valve means for directing air under pressure to certain sides of certain of said pistons in response to said control signals for sequentially operating said pneumatic actuator means in accordance with said schedule.

* * * * *